T. HYATT.
ILLUMINATING VAULT COVER.

No. 4,266. Patented Nov. 12, 1845.

Witnesses:
Wm H Bishop
Andrew De Lacy

Inventor:
Thaddeus Hyatt

UNITED STATES PATENT OFFICE.

THADDEUS HYATT, OF NEW YORK, N. Y.

VAULT-COVER.

Specification forming part of Letters Patent No. 4,266, dated November 12, 1845; Reissued April 3, 1855, No. 303.

*To all whom it may concern:*

Be it known that I, THADDEUS HYATT, of the city of New York, in the State of New York, have invented certain new and useful Improvements in the Manner of Constructing an Illuminating Vault-Cover for the closing of openings from streets or yards into vaults and through the decks of vessels into cabins, as well as in other situations where it is important to admit light, and to so arrange the parts that the glass through which it is to be admitted shall be protected from injury; and I do hereby declare that the following is a full and exact description thereof.

The covers for vaults, &c., which have been fitted with glass, have, as heretofore constructed, consisted, in general, of a metal rim, which was made to contain a large plano-convex glass. These glasses are extremely liable to fracture, and when broken leave large and dangerous openings within their rims; and from their thickness, and their soon becoming scratched over their whole external surface, the quantity of light admitted by them is much less than would seem to be due to their size. To obviate these objections, I have so contrived my illuminating vault-cover, as to admit the light through a considerable number of small glasses, or lenses, which are so set into the iron cover, as effectually to defend them from injury by the falling or pressure of weighty bodies upon them, or from the expansion and contraction of the metal, they being protected by knobs, or protuberances on the iron cover, and defended also by being set in a frame work of wood or of soft metal, or of wood and soft metal combined, which will yield to percussion and thus aid effectively in preventing the breaking of the glass. In situations where it is desirable I combine a ventilator with my vault cover, in such a manner, as to allow a current of air, or vapor, to pass freely, while the entrance of water from without, under ordinary circumstances, is prevented.

Figure 1:
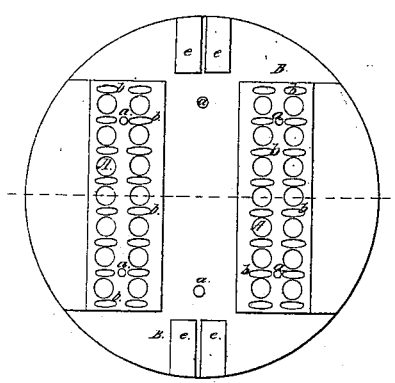
Figure 4:
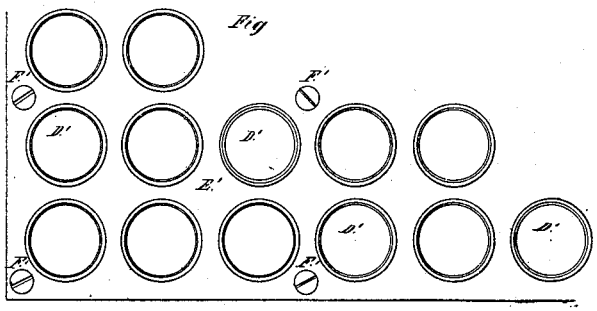
Figure 2:
Figure 5:
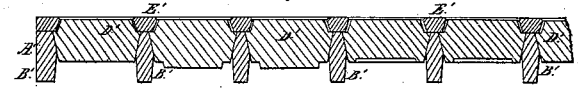
Figure 3:
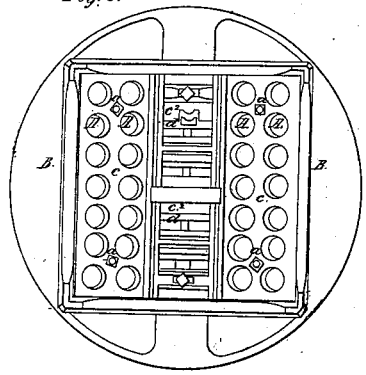
Figure 6:
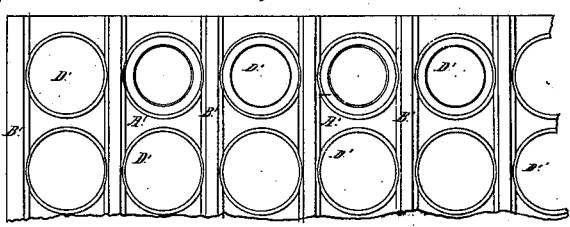
Figure 7:
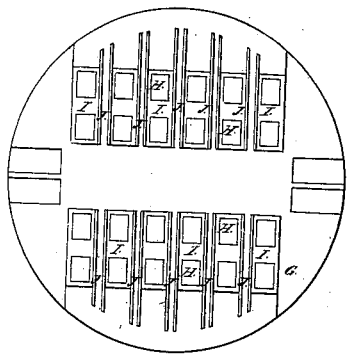
Figure 8:
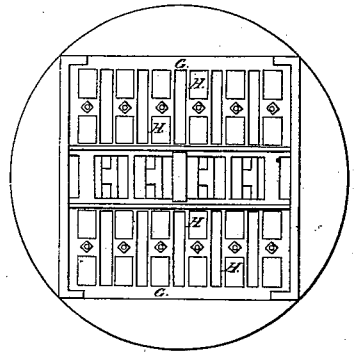
Figure 9:
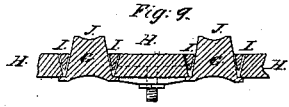

In the accompanying drawing Figure 1 is a top view of my illuminating cover, Fig. 2 is a vertical section through it in the line $x, x,$ of Fig. 1. Fig. 3 represents the under side of the cover with the ventilator attached.

A A are the glasses, or lenses of which I have shown twenty-eight in four rows, as set in a cast iron plate B B; those lenses that I have actually made have been about seven eighths of an inch in diameter, but they may safely be made of double this diameter or more; and where the ventilator is not wanted they may, of course, be made to occupy the part where that is shown as being situated. In the section Fig. 2 the form which I have given to the glasses is that of lenses; and the manner of setting them in wood is fully represented.

C C' are two laminæ of wood in the uppermost of which the lenses are affixed in such manner as that their convex faces shall project above the surface of the iron casting; the lowermost piece bears on the edges of the lenses and keeps them in place; the whole are confined together by screws and screw nuts $a, a$. On the face of the plate B B, on each side of the lenses, there are cast, knobs, or protuberances $b, b,$ which should rise a trifle higher than the most convex part of the lenses, and which will thus effectually protect them from injury. If preferred, the piece C', that holds the glasses or lenses, may be made of lead, pewter, or other soft metal; I prefer to make my illuminating glasses circular, and convex on one side, as represented; but they may be made square, or in other forms, and have their faces flat, under a combination and arrangement substantially the same with that I described. I do not intend therefore to limit myself to any particular number, or form, of the glasses.

In Fig. 3 the manner of fixing the ventilator is shown; it is made similar to the lattice ventilator, or damper, in common use, consisting of two perforated plates $c$ and $d$ one of which slides upon the other, so as to admit, or prevent, the passage of air. The air or vapor passes in or out at openings provided at $e, e,$ in the plate B, B; these openings have ledges on their lower sides which prevent the influx of water from rain, excepting the pavement were actually flooded.

Having thus fully described the nature of my improvements in the illuminating vault-cover, what I claim therein is new, and desire to secure by Letters Patent, is—

The combining with the covering plate B B, a series of glasses of any suitable form, or of lenses, such as are shown at A A; said combination being effected substantially in the manner described, by the aid of laminæ of wood, or of soft metal, as shown at C C' and the glasses, or lenses, being defended from injury by knobs, or protuberances, as herein set forth.

THADDEUS HYATT.

Witnesses:
 WM. B. AITKEN,
 ALFRED B. KETCHAM.

[FIRST PRINTED 1914.]